US006336185B1

(12) United States Patent
Sargenti, Jr. et al.

(10) Patent No.: US 6,336,185 B1
(45) Date of Patent: Jan. 1, 2002

(54) USE OF OTHER PROCESSORS DURING BIOS BOOT SEQUENCE TO MINIMIZE BOOT TIME

(75) Inventors: William Arthur Sargenti, Jr., Corona; David Lawrence French, Rancho Santa Margarita, both of CA (US)

(73) Assignee: Phoenix Technologies Ltd., San Jose, CA (US)

( * ) Notice: Subject to any disclaimer, the term of this patent is extended or adjusted under 35 U.S.C. 154(b) by 0 days.

(21) Appl. No.: 09/159,610

(22) Filed: Sep. 24, 1998

(51) Int. Cl.$^7$ ................................................. G06F 15/177
(52) U.S. Cl. ...................................................... 713/2; 713/1
(58) Field of Search ............................................... 713/1, 2

(56) References Cited

U.S. PATENT DOCUMENTS

| 5,642,506 A | * | 6/1997 | Lee ..................................... 713/1 |
| 5,682,528 A | | 10/1997 | Baker et al. ................... 395/651 |
| 5,768,585 A | * | 6/1998 | Tetrick et al. ...................... 713/2 |
| 5,790,850 A | | 8/1998 | Natu ................................ 395/652 |
| 5,904,733 A | * | 5/1999 | Jayakumar .......................... 713/2 |
| 5,951,683 A | * | 9/1999 | Yuuki et al. ....................... 713/1 |
| 6,158,000 A | * | 12/2000 | Collins ............................. 713/1 |

FOREIGN PATENT DOCUMENTS

WO          W097/04385          2/1997     ............. G06F/9/445

* cited by examiner

*Primary Examiner*—Bipin Shalwala
*Assistant Examiner*—Nitin Patel

(57) ABSTRACT

A method for use in a multi-processor system, including a boot strap processor and at least a first processor, for booting the system by executing a plurality of boot sequence tasks, comprising the steps of causing the boot strap processor to execute at least one task from the plurality of boot sequence tasks, and causing the first processor to execute a task in the plurality of boot sequence tasks that is different from the task being executed by the boot strap processor and is executed at least partially in parallel with the execution by the boot strap processor.

23 Claims, 1 Drawing Sheet

USE OF OTHER PROCESSORS DURING BIOS BOOT SEQUENCE TO MINIMIZE BOOT TIME

FIELD OF THE INVENTION

The present invention relates generally to the field of computer systems, and more particularly, to the process of booting for computer systems.

BACKGROUND OF THE INVENTION

All computers, such as personal computers (PC's) and servers, execute "operating system software" that instructs the PC on how to use other programs, termed "application software", such as word processing and spreadsheet programs. Examples of operating systems include MS-DOS and WINDOWS, manufactured by Microsoft Corporation.

Before a PC or server can run an operating system, it must load the operating system from a disk to the PC's working memory, which is ordinarily random access semiconductor memory (RAM). This function is carried out through a process know as "boot strapping", or more simply, "booting" the PC. Booting occurs automatically when the PC is first turned on by a process called a "Cold Boot," or by the user while the computer is running ("Warm Boot").

Boot strapping usually performs at least two functions, including running a power-on self-test function, or POST, and searching the storage media (floppy diskette or hard drive) for the operating system that it is to load. These functions are controlled by firmware stored in one or more basic input-output systems, or BIOS, inside the computer.

The POST initializes all of the internal hardware and hardware connected to the PC or server that is known to it. Such hardware connected to the PC or server may include memory, and printers, fax machines, and other peripherals. The POST will test each of these items of hardware connected to the computer and place the hardware in an operational state.

Currently, the boot process can take up to several minutes in server systems, or in desktop systems that have large memory and/or device configurations. The boot process is executed in a monolithic format, with each function following the previous function in a defined and logical order. As systems become more complex, boot times will continue to increase. It is highly desirable to be able to reduce the boot time in a simple and economical way that does not require major code or architectural changes to a system.

SUMMARY OF THE INVENTION

Briefly, the invention comprises, in one embodiment, a method for use in a multi-processor system, including a boot strap processor and at least a first processor, for booting the system by executing a plurality of boot sequence tasks, comprising the steps of: causing the boot strap processor to execute at least one task from the plurality of boot sequence tasks; causing the first processor to execute a task in the plurality of boot sequence tasks that is different from the task being executed by said boot strap processor and is executed at least partially in parallel with the execution of the at least one task by the boot strap processor.

In a further aspect of the present invention, a second processor is included, and the method further comprises the step of causing the second processor to execute another task from the plurality of boot sequence tasks that is different from the tasks being executed by the boot strap processor and the first processor, and which execution is at least partially in parallel with the execution by one of the other processors.

In a further aspect of the present invention, the first processor is caused to execute a plurality of boot sequence tasks.

In yet a further aspect of the present invention, each of the boot sequence tasks, after execution is initiated, can be completed without reference to data from any other processor.

In yet a further aspect of the present invention, at least one of the boot sequence tasks of the plurality of boot sequence tasks being executed by the first processor includes the step of waiting to initiate a task until another of the processors has executed a predetermined boot sequence task, before taking an action.

In a further aspect of the present invention, the step of causing the boot strap processor to execute includes the step of providing the first processor with an address to begin execution.

In yet a further aspect of the present invention, the first processor is an application (AP) processor, and further comprising the step of determining how many AP processors are present in the system.

In a further aspect of the present invention, each different one of the processors executes boot sequence tasks in accordance with a different POST Table.

In another embodiment of the present invention, a method is provided for use in a multi-processor system, including a boot strap processor and at least a first and a second application (AP) processors, for booting the system by executing a plurality of boot sequence tasks, comprising the steps of: determining how many AP processors are in the system; causing the boot strap processor to execute a plurality of boot sequence tasks, including providing each of the first and second AP processors with an address in BIOS from which to begin execution and to load a different POST Table for each of the AP processors, which POST Table includes one or more tasks in the plurality of boot sequence tasks; and wherein the first and second AP processors execute at least one boot sequence task in their respective POST Tables which is different from the plurality of boot sequence tasks being executed by the boot strap processor.

In yet a further aspect of the present invention at least one of the processors determines whether another one of the processors has executed a predetermined boot sequence task before executing a predetermined boot sequence task in its POST Table.

In yet a further embodiment of the present invention, a computer program product is provided comprising a computer usable medium having computer readable program code embodied therein for causing a system with multiple processors including a boot strap processor and at least a first processor, to boot the system by executing a plurality of boot sequence tasks in an expedited manner, the computer readable program code in the computer program product comprising: first computer readable code for causing a boot strap processor to execute at least one boot sequence task; and second computer readable code for causing the first processor to execute a boot sequence task that is different from the task being executed by the boot strap processor and is executed at least partially in parallel with execution of the at least one boot sequence task by the boot strap processor.

In yet a further aspect of the present invention, third computer readable code is provided for causing a second processor to execute another task from the plurality of boot sequence tasks that is different from the tasks being executed by the boot strap processor and is executed at least partially in parallel with the execution by one of the other processors.

In a further aspect of the present invention, fourth computer readable program code is provided to cause said first processor to execute a plurality of the boot sequence tasks, wherein at least one of those tasks to be executed by the first processor is not executed until a predetermined task at another processor has been completed.

In yet a further embodiment of the present invention, a multi-processor system is provided that is designed to boot by executing a plurality of boot sequence tasks, with some of those tasks being executed at least partially in parallel by different processors, comprising: a boot strap processor programmed to execute at least one task in the plurality of boot sequence tasks; and a first processor programmed to execute a task in the plurality of boot sequence tasks that is different from the task being executed by the boot strap processor and is executed at least partially in parallel with the execution of the boot sequence task by the boot strap processor.

In yet a further aspect of the present invention, the first processor is an application (AP) processor, and further comprising a second AP processor programmed to execute another task in the plurality of boot sequence tasks that is different from the tasks being executed by the boot strap processor and the first AP processor and executes the another task at least partially in parallel with the execution by one of the other processors.

DETAILED DESCRIPTION OF THE PREFERRED EMBODIMENT

Figure 1:
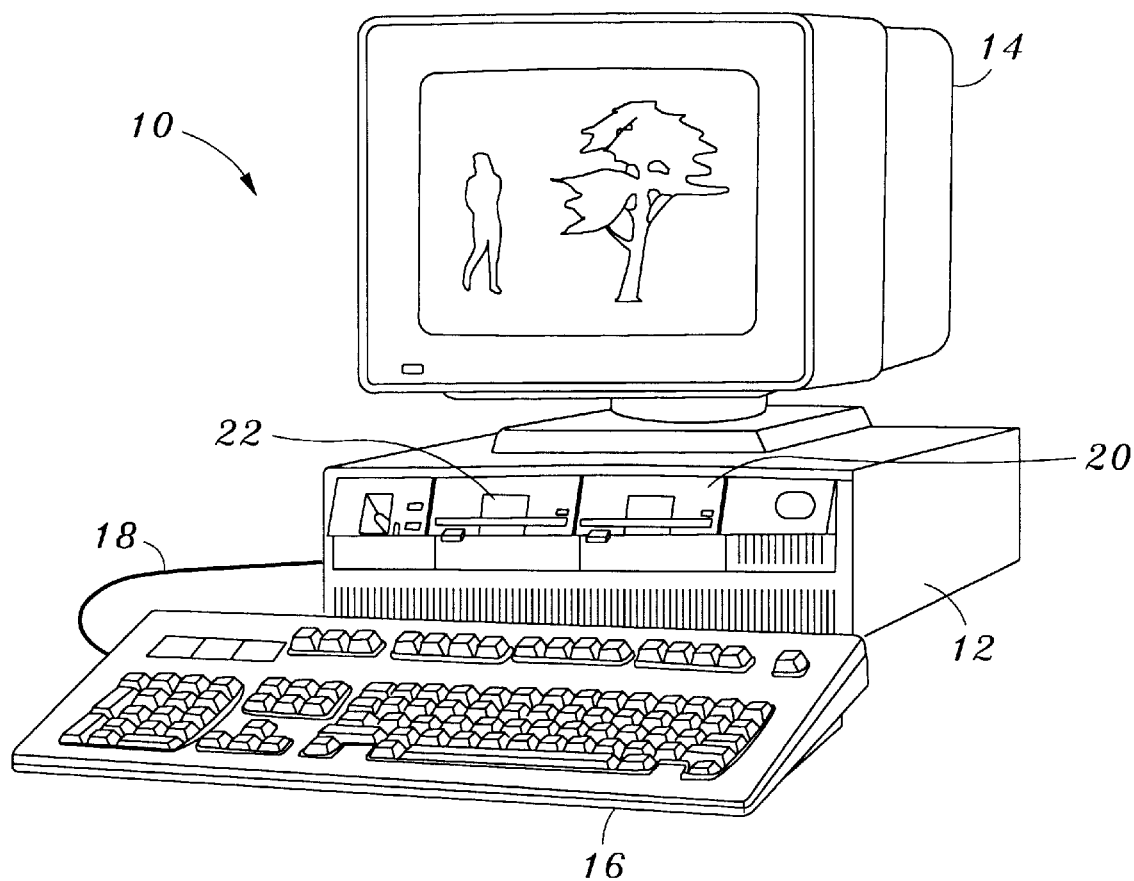
FIG. 1 is a schematic block diagram of one embodiment of the present invention.

The present invention makes use of one or more processors within a computer system to decrease the total boot time. This is accomplished by creating a parallel boot sequence path for at least one other processor in addition to a boot strap processor, such that this other processor executes certain boot sequence functions that enhance the boot sequence flow, but does not interfere with the boot strap processor (BSP) operation. This parallel boot sequence path will be initiated by the BSP processor at a point early in the POST process.

It should be noted that the present invention will typically be implemented at design time for the system. In particular, at design time it will be determined which tasks in the POST task sequence are fixed tasks that can be passed off to another processor. However, it should be noted that implementation also could be dynamic through the use of subroutines.

Fixed tasks that can be passed off to a processor other than BSP processor, for example, include memory sizing tasks, hardware register setup tasks, initialization of peripheral devices, the setting up of software registers, and the operation of minor subroutines. The tasks in the POST task sequence are examined either at design time or dynamically to determine which of these tasks can be performed in parallel, and which must be done sequentially.

For a task which must be performed sequentially only after the completion of a predetermined task, such task could either be performed in the same processor that is processing the task that must precede it, or it could be performed in another processor through the use of a semaphore to prevent this sequential task from executing on the other processor until the predetermined task has been completed. A semaphore is a memory location that contains the current POST code for a task being executed by a given processor. A semaphore is useful for indicating the completion of a task by a processor. By way of example, a semaphore or memory location designating the status of a particular task could have the value of zero, indicating that a processor is still processing a predetermined task. If a value other than zero is in the semaphore memory location, then that indicates that the task has been completed and any dependent sequential task can begin execution on another processor. This process insures that the boot sequence is performed in a logical order. In essence, the semaphores provide a communication mode between processor.

Accordingly, when a processor, such as a BSP processor or another processor completes a boot sequence task, it will then check to see if there is a semaphore test point associated with the next task to be performed. If such a semaphore test point is present in its next macro code line, then the processor will wait for the predetermined task at the other processor to be completed and for the appropriate POST code to be placed in the semaphore. By way of example, an AP processor may have a BSP POST code listed as a semaphore test point for its next operation. Accordingly, the AP processor will not perform this next macro operation until the BSP processor has executed the referenced BSP POST task and placed that task code in the appropriate semaphore memory location.

Additionally, a break value could be set by the BSP processor in a semaphore to indicate to an AP processor or other processor used for performing booting tasks in parallel that a break condition (i.e., an error message) has occurred and that the processing for that processor should cease.

In the process of initializing the processors to be utilized to perform this parallel booting function, the BSP processor will execute a subroutine to initialize the processors to be utilized. In essence, BSP processor sends a starting address in the BIOS to the particular processor. That address will include code providing the location of a POST table for that processor. That processor will then execute the macros listed in the designated POST table for that processor, with the actual flow being controlled by semaphores in the macro lines in its POST Table.

A wide variety of different types of processors may be utilized to perform the partial or fully parallel execution of POST tasks. Such processors may include application processors, internal peripheral processors such as disk drive processors, CD-ROM processors, floppy drive processors and external peripheral processors. However, the BIOS must be designed to power up and initialize any processors which are to be used with the present invention and the processors must have sufficient processing power to be able to execute the particular task assigned for execution.

In a preferred embodiment of the present invention, the processors utilized to implement the parallel processing paths are application (AP) processors. AP processors are advantageous because most BIOS are already designed to support AP processors, i.e., the BIOS includes code to power-up and initialize the AP processors when the computer is turned on. Another advantage of using AP processors is that typically the AP processors are generally of the same processor type as the BSP processor, so that they will typically have processing power sufficient to execute most, if not all, tasks in the boot task sequence, and they are generally also located on the mother board.

In a preferred embodiment, the boot sequence tasks chosen for parallel processing on other processors can be executed completely, once initiated, without reference to data or information from other processors. Although it is possible to have two processors pass information back and forth during the execution of these parallel tasks, such processor communication during task execution makes the system complicated and difficult to debug. Accordingly, it is preferred not to break boot sequence operation tasks into pieces for execution by different processors, but rather that an entire boot task be assigned to a processor to complete fully.

Referring now to FIG. 1, a computer 10 with multiple processors, such as a server or a personal computer is shown. The computer 10 includes a console housing 12 within which circuit boards and a mother board contain the necessary circuitry including a BSP processor, one or more application (AP) processors, BIOS chips, controllers, random access memory, and other hardware. In the example shown in the figure, the computer also includes a video display 14, and a keyboard 16 connected to the console housing 12 through a cable 18. Mass storage media may include a hard drive within the housing, and user accessible floppy disk and CD-ROM drives 20 and 21.

In order to facilitate implementation of the present invention, a POST table structure is created for each processor to be used to implement the present invention, which POST Table lists the boot sequence tasks to be performed by that processor. There would also be a revised POST table for the BSP processor. The composite of the revised POST table for the BSP processor and the POST tables for the other processors used to implement the invention (the AP processors in the preferred embodiment), will approximately equal the original POST table for the BSP processor. Additionally, a macro entry would be added to the POST table for the BSP processor in order to initialize the AP processors and begin the execution of boot sequence tasks. Also, where a particular task is dependent on the completion of another predetermined task by another processor, then a test point to a semaphore may be inserted in the particular macro line for the POST table for the processor designated to execute that dependent task.

Referring now to Table 1, there is shown an example of a revised BSP POST table. In essence, what is shown is a small portion from the overall revised BSP POST table. To explain in brief this table, the first line is a COLD TASK to be performed only on initial power up of the system and has a test point value of TP_CPU_INIT. This task runs two subroutines: a first OEM overwrite subroutine (hookAPCpuInitialize1J), and a default subroutine (APCpuInitializeJ), for initializing the AP processors with the different respective locations in memory, for example in the BIOS, where their appropriate POST tables and the coding for those processors is located.

The second line is a POST TASK (to be performed for all boots) with a test point value of SET_HUGE_ES. This task runs two subroutines: a first OEM overwrite subroutine for setting the addressing mode (hookSetHugeESJ), and a default subroutine (postSetHugeESJ) also for setting the addressing mode. The third line is designed to operate only for WARM TASKS and has a test point value of TP_DISABLE_NMI. This macro line performs both OEM overwrite (hookDisableNmiJ) to disable non-mask interrupts, and a default routine (postDisableNmiJ) also to disable non-mask interrupts.

The fourth line is performed only for WARM TASKs and has a test point value of TP_CPU_INIT. This macro performs an OEM overwrite (hookCpuInitialize1J) to initialize some of the CPU values, and also performs a default routine (cpuInitializej) to initialize the CPU values. Finally, the last line listed in the example is performed only for COLD TASKs and has a test point value TP_GET_CPU_TYPE. This macro performs an OEM overwrite (hookCpuGetTypeJ) and also performs a default subroutine (cpuGetTypeJ), both operational to determine the type of processor used for the boot strap processor.

Referring now to Table 2, there is shown an example POST table for an AP processor to be used for the parallel processing of boot sequence tasks in accordance with the present invention. Referring to the first macro line in the POST table, this line operates on all post tasks and has a test point value of TP_PRE_SIZE_RAM. This macro line has an OEM overwrite subroutine (hookCachePreRamAutosizeJ) and a default subroutine (cachePreRamAutosizeJ), both designed to set up cache registers prior to RAM autosizing. At the end of that line is a test point for a semaphore (TP_CHECKSUM) to prevent this macro line from executing until the CHECKSUM task has been executed by the BSP processor and the CHECKSUM number placed in the appropriate semaphore memory space.

The next line in the table is performed for all boots and has a test point value of TP_SIZE_RAM. This macro has an OEM override (hookRamAutosizeJ) and a default subroutine (csRamAutosizeJ) to automatically determine the size of the RAM. The third line in the table again is performed for all boots and has a test point value of TP_CACHE_AUTO. This macro has an OEM overwrite (hookCacheAutosizeJ) and a default subroutine (cacheAutosizeJ) for performing cache autosizing.

The fourth line in the table is performed only for WARM TASKS and has a test point value of TP_TEST_CONFIG. This macro line has an OEM overwrite (hookTestConfigJ) and a default subroutine (postTestConfigJ) for checking the status of the system for a bad configuration. At the end of the line is a test point to a semaphore TP_ERROR_MSGS. If the semaphore memory location has this value, indicating a bad configuration, then the AP processor will wait until this semaphore is cleared before executing the macro in that line. The last line in Table 2 is a POST TASK, performed for all booting operations, and has a test point of TP_END. Again this macro has OEM overwrite (hookAP1CompleteJ) and a default subroutine (postAP1CompleteJ), both of which provide completion subroutines which handle shutting the AP processor down and/or placing it in a SLEEP mode and any cleanup that is needed (cleaning out semaphore memory location, and setting up SMI code, for example). A semaphore will be set to indicate to the BSP processor and any other pertinent processors that this sequence of one or more tasks in this AP processor has been completed successfully.

By way of example, but not by way of limitation, a standard set of boot sequence tasks may be broken up to provide a hardware initialization and checking task to a first AP processor, to provide a memory initialization task to a second AP processor in order to effect an expedited booting sequence, with the remainder of the boot sequence tasks to be performed by the BSP processor.

As another example, the standard memory initialization and testing task for a BSP processor for a one gigabyte of memory could be broken up to have the BSP processor initialize and test 256 Meg of memory, to have a first AP processor initialize and test a different 256 Meg of memory, to have a third AP processor initialize and test a different 256 Meg of memory, and to have a fourth AP processor initialize and test the last 256 Meg of memory.

The present invention provides a significant boot time advantage which will become more and more critical as systems complexity increases. The present invention permits a substantial reduction in the boot time required for booting, and does this in a simple and economical way that does not require major code or architectural changes.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention and various embodiments and with various modifications as are suited to the particular use contemplated. It is intended that the scope of the invention be defined by the claims appended hereto, and their equivalents.

TABLE 1

| | Example BSP POST table: |
|---|---|
| COLD_TASK | TP_CPU_INIT, hookAPCpuInitialize1J, APCpuInitialize |
| POST_TASK | TP_SET_HUGE_ES, hookSetHugeESJ, postSetHugeESJ |
| WARM_TASK | TP_DISABLE_NMI, hookDisableNmiJ, postDisableNmiJ |
| WARM_TASK | TP_CPU_INIT, hookCpuInitialize1J, cpuInitializeJ |
| COLD_TASK | TP_GET_CPU_TYPE, hookCpuGetTypeJ, cpuGetTypeJ |

TABLE 2

| | Example AP Processor POST table: |
|---|---|
| POST_TASK_1 | TP_PRE_SIZE_RAM, hookCachePreRamAutosizeJ, cachePreRamAutosizeJ, TP_CHECKSUM |
| POST_TASK_1 | TP_SIZE_RAM, hookRamAutosizeJ, csRamAutosizeJ |
| POST_TASK_1 | TP_CACHE_AUTO, hookCacheAutosizeJ, cacheAutosizeJ |
| WARM_TASK_1 | TP_TEST_CONFIG, hookTestConfigJ, postTestConfigJ, FAR, TP_ERROR_MSGS |
| POST_TASK_1 | TP_END, hookAP1CompleteJ, postAP1CompleteJ |

We claim:

1. A method for use in a personal computer system, including a boot strap processor and at least a first peripheral processor, for booting the personal computer system by executing a plurality of boot sequence tasks, comprising the steps of:
    causing said boot strap processor to execute at least one task from said plurality of boot sequence tasks;
    causing said first peripheral processor to execute a task in said plurality of boot sequence tasks that is different from the task being executed by said boot strap processor and is executed at least partially in parallel with the execution of the at least one task by said boot strap processor.

2. A method as defined in claim 1, further comprising a second peripheral processor, and further comprising the step of causing said second peripheral processor to execute another task from said plurality of boot sequence tasks that is different from the tasks being executed by said boot strap processor and said first peripheral processor, which execution is at least partially in parallel with the execution by one of said other processors.

3. A method as defined in claim 2, wherein said first peripheral processor is caused to execute a plurality of boot sequence tasks.

4. A method as defined in claim 3, wherein at least one of said boot sequence tasks of said plurality of boot sequence tasks being executed by said first peripheral processor includes the step of waiting to initiate a task until another of said processors has executed a predetermined boot sequence task, before taking an action.

5. A method as defined in claim 1, wherein each of said boot sequence tasks, after execution is initiated, can be completed without reference to data from any other processor.

6. A method as defined in claim 1, wherein said step of causing said boot strap processor to execute includes the step of providing said first peripheral processor with an address to begin execution.

7. A method as defined in claim 6, wherein said step of providing said first peripheral processor with an address comprises the step of providing said first peripheral processor with an address in a BIOS.

8. A method as defined in claim 1, wherein said first peripheral processor is one of an internal peripheral processor and an external peripheral processor.

9. A method as defined in claim 1, wherein each different one of said processors executes boot sequence tasks in accordance with a different POST Table.

10. A method as defined in claim 9, wherein a plurality of said POST Tables are loaded from a BIOS.

11. A method as defined in claim 1, further comprising the step of said first peripheral processor executing a final step of going into a sleep mode.

12. A computer program product comprising a computer usable medium having computer readable program code embodied therein for causing a personal computer system with multiple processors including a boot strap processor and at least a first peripheral processor, to boot the system by executing a plurality of boot sequence tasks in an expedited manner, the computer readable program code in said computer program product comprising:
    first computer readable code for causing a boot strap processor to execute at least one boot sequence task; and
    second computer readable code for causing said first peripheral processor to execute a boot sequence task that is different from the task being executed by said boot strap processor and is executed at least partially in parallel with execution of the at least one boot sequence task by said boot strap processor.

13. A computer program product as defined in claim 12, further comprising:
    third computer readable code for causing a second peripheral processor to execute another task from said plurality of boot sequence tasks that is different from the tasks being executed by said boot strap processor and said first peripheral processor and is executed at least partially in parallel with the execution by one of said other processors.

14. A computer program product as defined in claim 12, comprising:
    fourth computer readable program code to cause said first peripheral processor to execute a plurality of said boot sequence tasks, wherein at least one of those tasks to be executed by said first peripheral processor is not executed until a predetermined task at another processor has been completed.

15. A computer program product as defined in claim 12, wherein said first computer readable code includes fifth computer readable code for turning on said first peripheral processor and providing said first peripheral processor with an address to begin executing.

16. A computer program product as defined in claim 13, wherein said computer readable program code comprises a BIOS, and wherein each of said first, second and third computer readable code includes a different POST Table that includes at least one different task from said plurality of boot sequence tasks to be executed.

17. A computer program product as defined in claim 12, where said first and second peripheral processors are one of an internal peripheral processor and an external peripheral processor.

18. A personal computer system designed to boot by executing a plurality of boot sequence tasks, with some of those tasks being executed at least partially in parallel by different processors, comprising:
   a boot strap processor programmed to execute at least one task in said plurality of boot sequence tasks; and
   a first peripheral processor programmed to execute a task in said plurality of boot sequence tasks that is different from the task being executed by said boot strap processor and is executed at least partially in parallel with the execution of the boot sequence task by said boot strap processor.

19. A personal computer system as defined in claim 18, further comprising a second peripheral processor programmed to execute another task in said plurality of boot sequence tasks that is different from the tasks being executed by said boot strap processor and said first peripheral processor, and which second peripheral processor executes said another task at least partially in parallel with the execution by one of said other processors.

20. A personal computer system as defined in claim 19, wherein said first peripheral processor is programmed to execute a plurality of said boot sequence tasks.

21. A personal computer system as defined in claim 20, wherein said first peripheral processor is programmed to execute one of said plurality of boot sequence tasks only after another processor has executed a predetermined boot sequence task.

22. A personal computer system as defined in claim 20, wherein said processors are programmed to complete execution of any boot sequence task, after the initiation of the boot sequence task, without reference to data or the execution of any other processor.

23. A multi-processor system as defined in claim 18, wherein each of said processors is programmed with a different POST Table that determines the sequence of subroutines that are to be executed by that processor.

\* \* \* \* \*